Sept. 16, 1958     W. S. PRAEG     2,851,930
INTERNAL GEAR GENERATOR

Filed Dec. 27, 1955     2 Sheets-Sheet 1

FIG.I.

INVENTOR.
WALTER S. PRAEG
BY *Whittemore*
*Hulbert & Belknap*
ATTORNEYS

Sept. 16, 1958     W. S. PRAEG     2,851,930
INTERNAL GEAR GENERATOR
Filed Dec. 27, 1955     2 Sheets-Sheet 2

*INVENTOR.*
WALTER S. PRAEG
BY *Whittemore,*
*Hulbert & Belknap*
ATTORNEYS

United States Patent Office 2,851,930
Patented Sept. 16, 1958

2,851,930

INTERNAL GEAR GENERATOR

Walter S. Praeg, Detroit, Mich.

Application December 27, 1955, Serial No. 555,374

10 Claims. (Cl. 90—1.6)

The present invention relates to an internal gear generator.

It is an object of the present invention to provide a method and machine for producing internal gears by an operation which employs an elongated rotary cutter having axially spaced radially stepped annular sets of cutting teeth, the teeth being disposed on said cutter in helically aligned groups, the cutter being positioned with its small end adjacent an inner side at one side of an annular gear blank with the axes of the cutter and gear blank crossed in space at an angle of between 3 and 30 degrees, and thereafter fed axially while the gear blank and cutter are positively rotated in accurately timed relationship.

It is a further object of the present invention to provide a machine and method for producing internal gears as described in the preceding paragraph, in which the teeth of the internal gear are crowned longitudinally and the amount of crowning is determined by the annular relationship between the axes of the gear and cutter.

It is a further object of the present invention to provide method and apparatus for producing internal gears in which the teeth of the gear are tapered or unsymmetrically crowned, and in which the taper and/or unsymmetrical crowning is determined by the location of the common normal to the axes of the gear and cutter.

It is a further object of the present invention to provide apparatus for producing internal gears which comprises a rotary work support, means for adjusting said work support perpendicular to its axis, a tool support, means for adjusting said tool support angularly about an axis intersecting the axis of said work support, a rotary tool spindle carried by said tool support, means for effecting axial advance of said tool spindle, and guide means for superimposing an angular adjustment dependent upon the helix angle of groups of teeth on a cutter carried by said tool spindle upon the rotation thereof.

Other objects and features of the invention will become apparent as the description proceeds, especially when taken in conjunction with the accompanying drawings, wherein.

Figure 1:
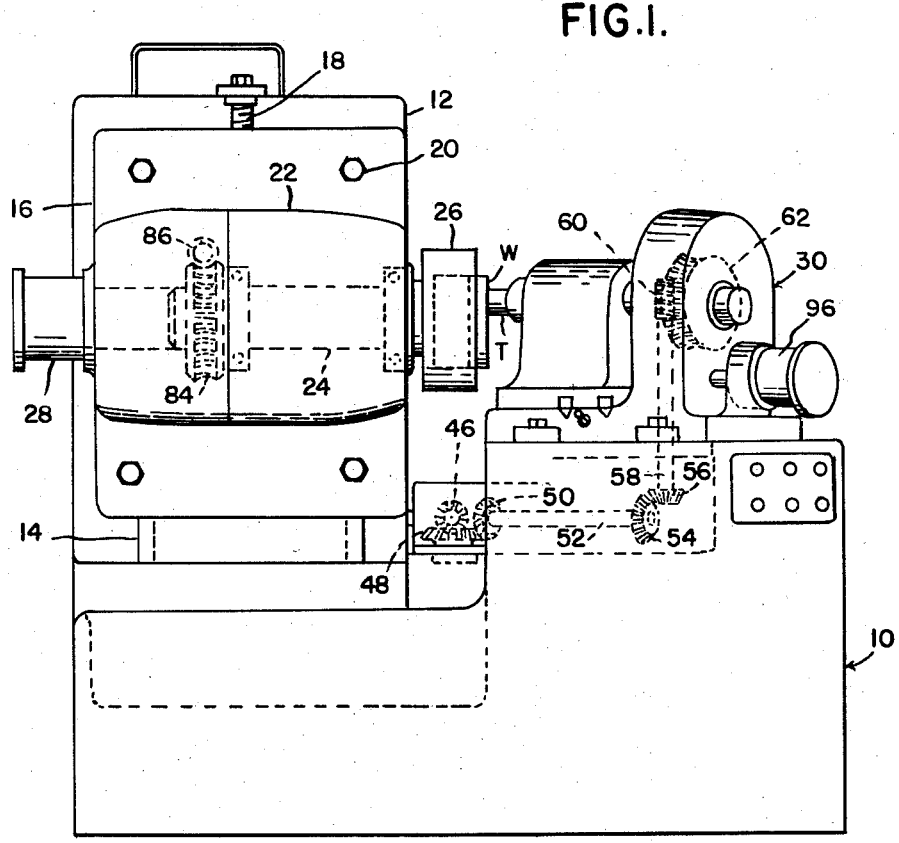
Figure 1 is a front elevational view of an internal gear generator constructed in accordance with the present invention.

The machine for generating internal gears comprises a base 10 having a column 12 thereon the front face of which is provided with vertically extending ways indicated at 14, on which is mounted a vertically adjustable work slide 16. Suitable means are provided for effecting vertical adjustment of the slide 16, these means being illustrated as comprising an adjusting screw 18. The slide 16 is firmly clamped in a desired position of vertical adjustment by tightening the clamping screws 20. Carried by the work slide 16 is a work spindle housing 22 in which is mounted a rotatable work spindle 24 having a suitable work supporting head or chuck 26 at one end thereof. Details of the chuck form no part of the present invention but conveniently it may comprise a radially clamping chuck actuated by air or hydraulic pressure acting in a clamping cylinder 28.

Located on the base 10 is a tool support 30 which is mounted on arcuate ways indicated generally at 32 for angular adjustment about a pivot axis X, which axis intersects and is perpendicular to the axis of the work support spindle. Again, the work support 30 may be clamped in accurately adjusted position by means of T-bolts 34.

Mounted for rotation and for axial movement relative to the tool support 30 is a tool spindle 36 adapted to carry at one end thereof the cutting tool T.

Means are provided for driving the work spindle 24 and the spool spindle 36 at substantial speeds and in accurately timed relationship. In accordance with the present invention the work and tool spindles are rotated at speeds such that the pitch line velocity of both the tool and work blank is in excess of 300 feet per minute.

As illustrated herein, a single motor 40 is provided for effecting timed rotation of the work and tool spindles. The motor 40 through belting indicated at 42 drives a shaft 44 which in turn drives a first train of gearing connected to the tool spindle, and a second train of gearing connected to the work spindle. At its forward end the shaft 44 carries a bevel gear 46 meshing with a bevel gear 48 which in turn drives a bevel gear 50 carried by a shaft 52. The shaft 52 in turn carries a bevel gear 54 meshing with a bevel gear 56 connected to a vertically extending shaft 58. At the upper end of the shaft 58 is a worm 60 meshing with a worm gear 62.

Adjacent the rear of the machine the shaft 44 carries a bevel gear 64 which drives a bevel gear 66 coupled through coupling 68 to bevel gear 70, the latter in turn driving a bevel gear 72. A pair of change gears 74 and 76 are provided, the gear 74 being secured to the shaft 78 which carries the bevel gear 72. Extending upwardly from the change gear 76 is a shaft 80 the upper end of which is splined as indicated at 82.

Figure 2:
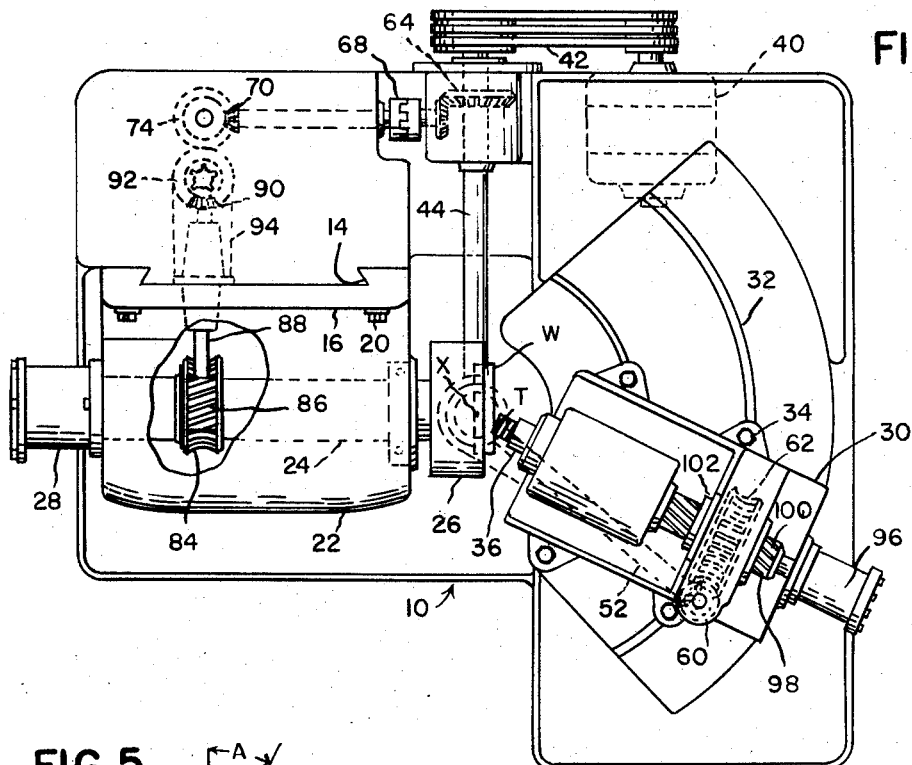
Figure 2 is a plan view of the apparatus shown in Figure 1.

The mechanism for rotating the work spindle 24 comprises a worm gear 84 driven by a worm 86. The worm gear 84 and worm 86 are preferably identical with the worm 62 and worm gear 60 used for driving the tool. The worm 86 is connected by a shaft 88 to a bevel gear 90 which in turn meshes with bevel gear 92 splined on the upper end of the shaft 80. As best indicated in Figure 2, the bevel gears 90 and 92 together with the shaft 88 and worm gear 86 are supported by a housing structure 94 rigidly attached to the rear side of the work slide 16 so as to partake of vertical adjustment thereof. The spline connection between bevel gear 92 and the shaft 80 permits vertical adjustment of the work support to accommodate gear blanks of different size while maintaining the same driving relationship therewith.

As will subsequently appear, the cutter which is employed in conjunction with the present invention is an elongated rotary cutter having axially spaced radially stepped annular sets of cutting teeth. In some cases these cutting teeth are disposed in groups parallel to the axis whereas in other cases the groups may be disposed to extend at a definite helix angle with respect to the axis of the cutter. The machining operation is carried out essentially as a result of an axial feeding movement of the cutter or tool T upwardly and to the left as viewed in Figure 2. Means independent of the mechanism for rotating the work piece and tool is provided for effecting this axial advance. Such means is illustrated as comprising a fluid cylinder 96, preferably hydraulic, for effecting a slow controlled axial advance of the tool T.

It will be apparent that where the groups of cutting teeth on the tool are disposed at a helix angle, axial advance of the tool or cutter disturbs the true timed relationship between the rotating cutter and the work piece. In order to compensate for the helix angle of the groups of teeth on the cutter, a spur or helical guide 98 is provided having guiding teeth or ribs 100 formed thereon extending at a helix angle dependent on the helix angle of the groups of teeth on the cutter. It will of course be apparent that if the teeth of each group on the cutter are parallel to the axis thereof, then the teeth or ribs 100 on the guide 98 will also be parallel to its axis. The guide 98 is slidably received in a nut 102 having correspondingly formed teeth or ribs to mate with the guide. The nut 102 is secured to the worm gear 62.

With the foregoing arrangement it will be apparent that the rate of axial advance of the tool T relative to the work is in no way dependent upon the timed rotation of the work piece and tool. Accordingly, the cutter may be advanced at a constant or variable rate as required to produce the most efficient cutting. Its advance may moreover be stopped while the parts remain in meshed relation and in rotation and the tool may be withdrawn while the parts are still rotating without disturbing the true meshing relationship. This permits a selection of the rate of feed of the tool determined to produce the most efficient results. For example, initial advance may be at a relatively rapid rate and produce a rough cutting operation intended to remove a large quantity of metal in the shortest time. Thereafter, the rate of advance may be reduced so as to produce smooth accurately finished surfaces on the teeth of the internal gear generated thereby.

Figures 3, 4, 5:
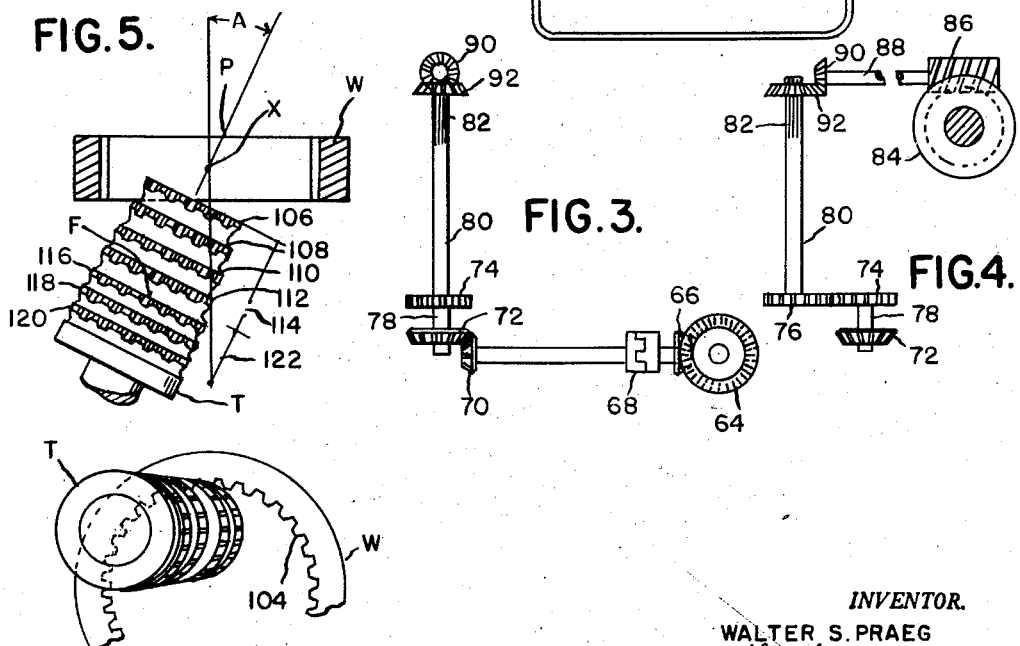
Figure 3 is an elevational view of the work drive train of gears.
Figure 4 is a side elevational view of the train of gears shown in Figure 3.
Figure 5 is a diagrammatic plan view showing the relationship between a cutter and the work piece at the initiation of the machining operation.
Figure 6:
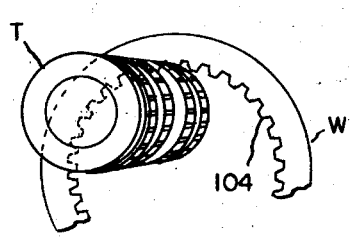
Figure 6 is a front elevational view of the gear and cutter.

Referring now to Figures 5 and 6 there is illustrated the relationship between a gear blank W and the tool T at the initiation of a cutting stroke. At this time it will be observed that the tool is in position to form teeth 104 when fed axially toward the small end thereof. It will be observed in Figure 5 that the line perpendicular to the axes of both the work blank and tool, indicated at X, is in this instance located substantially midway between opposite sides of the gear blank W.

Referring now to Figure 5 the tool or cutter T is illustrated as having four radially stepped axially spaced annular sets of cutting teeth designated 106, 108, 110 and 112 respectively. These sets of teeth designated collectively at 114, constitute the roughing teeth. Axially spaced annular sets of teeth designated 116, 118 and 120, and designated collectively at 122, constitute finishing teeth. The sets of finishing teeth 116, 118 and 120 are all of the same size. This permits the cutter to produce uniform size gears as the successive sets of finishing teeth are worn down.

It will be appreciated that the arrangement of tool and work piece illustrated in Figures 5 and 6 if the tool is advanced such that the point F reaches the point P, will produce crowned internal teeth on the work piece W. This follows from the relationship between a cylinder disposed with its axis crossed with respect to the axis of an annular body in which the cylinder is disposed. By a crowned tooth is meant a tooth having end portions thinner or of lesser tooth thickness than in the center thereof. So long as the point X is located midway between opposite sides of the gear blank W, the teeth produced by the generating operation will be uniformly crowned, or in other words will be thickest at substantially midway between their ends. If desired, means (not shown) may be provided for effecting slight lateral displacement of the tool support 30 or for supporting the work piece W slightly to the right or left of the position illustrated in Figure 2. This will have the effect of shifting the point X toward one side or the other of the gear blank W. If the point X is located in the plane of one side of the gear blank W, the teeth produced will be non-uniformly tapered teeth having a maximum tooth thickness at the end thereof adjacent the side which contains the point X. Alternatively of course, the location of the point X may be shifted to different positions within the sides of the gear blank so as to produce non-uniformly crowned teeth.

By way of specific examples, if the helix angle of the gear to be produced is 20 degrees and the angle A (Figure 5) between the axes of the gear and work piece is also 20 degrees, then the teeth on the cutter are so disposed that the aligned teeth of each group thereof are parallel to the axis of the cutter. In this case the tool is a spur cutting tool and the teeth or ribs 100 on the guide 98 will likewise be of spur type. When the point F on the tool T reaches the point P, as seen in Figure 5, the internal gear is finished. Assuming that the point X was midway between opposite sides of the work piece W, the teeth of the internal gear W produced by this operation will be uniformly crowned, having a maximum tooth thickness substantially midway between the ends thereof. Obviously, the amount of crown produced in the teeth is a function of the crossed axes and in general for the present operation the crossed axes angle A is kept between 3 and 30 degrees.

If for example, a spur gear is to be produced and 15 degrees crossed axes is selected as the proper angle to produce a required crown, the required helix angle of the tool also becomes 15 degrees and in this case the tool is advanced axially with the guide or master lead bar 98 passing through the nut 102, both of these parts having a lead based on the 15 degrees helix angle of the tool.

In case a gear having a 35 degrees helix angle right hand is to be produced and 15 degrees crossed axes is selected as the proper crossed axes angle A, the helix angle of the tool becomes 20 degrees left hand and in this case the tool is advanced axially through a guide or master lead bar 98 associated with a nut 102 having a lead based on the 20 degrees helix angle of the tool.

The greater the crossed axes angle A, the more crown is provided in an internal gear. When the operation disclosed herein is used for producing gears which are to be finished by a subsequent operation such as shaving, a greater crossed axes such for example as 20 degrees will give increased cutting efficiency. However, this may produce a crown greater than that desired in the finished product. In such case however, the amount of crown may be reduced or eliminated by a subsequent shaving operation. If the gear is intended for use without a subsequent finishing operation, normally a smaller crossed axes angle A such for example as from 5 to 15 degrees, will be employed.

The present invention has as an important advantage the long tool life which results from an operation in which a sequence of finishing teeth are initially provided on the tool. So long as the set 116 of finishing teeth remains sharp and of full size, the sets 118 and 120 do not come into use except possibly in a minor way. However, as the teeth 116 become dull and are resharpened in conjunction with resharpening of the roughing teeth collectively identified at 114, set 118 of the finishing teeth becomes fully operative.

While four sets of roughing teeth and three sets of finishing teeth have been indicated, it will of course be apparent that the number of sets of both roughing and finishing teeth may be changed as desired and as the character of the gear to be produced dictates. Thus for example, on a coarse pitch gear it will ordinarily be desirable to provide more stages in the roughing section of the tool.

The drawings and the foregoing specification constitute a description of the improved internal gear generator in such full, clear, concise and exact terms as to enable any person skilled in the art to practice the invention, the scope of which is indicated by the appended claims.

What I claim as my invention is:

1. The method of cutting internal gears which comprises positioning one end of an elongated rotary cutting tool member having axially spaced, radially stepped annular sets of cutting teeth adjacent one inner side of an annular gear blank member with the axes of the members crossed at an angle of between 3 and 30 degrees, driving both of the members in accurately timed relation, relatively feeding said members parallel to the axis of the cutter member to rough cut the teeth.

2. The method as defined in claim 1 in which the common normal to the axes of said members is located substantially midway between the sides of said blank to produce symmetrically crowned teeth.

3. The method as defined in claim 1 in which the common normal to the axes of said members is located closer to one side of the blank than the other to produce unsymmetrically crowned or tapered teeth.

4. The method as defined in claim 1 in which the last few sets of teeth on the cutter are of uniform diameter and in which relative feeding is continued until at least one of said last few sets has traversed completely across the face of the gear blank member.

5. The method as defined in claim 1 in which said teeth are disposed on said cutter member in helically aligned groups, and which comprises superimposing on the aforesaid rotation of one of said members an angular adjustment dependent on the helix angle of the groups of teeth of said tool member.

6. The method as defined in claim 1 in which said teeth are disposed on said cutter member in helically aligned groups, and which comprises superimposing on the aforesaid rotation of said tool member an angular adjustment dependent on the helix angle of its groups of teeth.

7. The method as defined in claim 1 in which the rotation of said members is at a pitch line velocity of at least 300 feet per minute.

8. An internal gear cutting machine comprising a base, a work support including a work supporting spindle adjustable on said base in a direction perpendicular to its axis, a tool support on said base angularly adjustable thereon about an axis perpendicular to and intersecting the axis of said work support, a rotary tool spindle in said tool support, an elongated rotary cutter on said tool spindle, said cutter having a plurality of axially spaced radially stepped annular steps of cutting teeth with the corresponding teeth of successive sets in helical alignment positive drive means for driving both said work support and tool spindle in accurately timed relation, means for feeding said tool spindle axially, and means for superimposing angular adjustment on said spindle in accordance with the helix angle of a tool carried thereby.

9. A machine for producing an internal gear having crowned teeth from a blank which comprises a rotary work support for an annular blank, an elongated cutter having a plurality of axially spaced radially stepped annular sets of cutting teeth with the corresponding teeth of successive sets in helical alignment, rotary means for supporting said cutter in said blank in cutting relation to one side thereof with the axes of said blank and tool crossed at an angle of between 3 degrees and 30 degrees, means for rotating said work support and cutter in timed relation at cutting speed, means for advancing said cutter at feeding speeds axially to a point at which a set of cutting teeth of maximum diameter have traversed fully across the inner surface of said blank.

10. A machine as defined in claim 9 comprising means for effecting axial adjustment of said work support to position a work piece in different positions relative to the common normal to the axes of the work support and cutter to selectively produce uniformly and non-uniformly crowned and tapered teeth.

References Cited in the file of this patent

UNITED STATES PATENTS

| | | |
|---|---|---|
| 2,280,045 | Miller | Apr. 14, 1942 |
| 2,528,242 | Praeg | Oct. 31, 1950 |

FOREIGN PATENTS

| | | |
|---|---|---|
| 243,514 | Germany | Feb. 16, 1912 |
| 739,487 | France | Oct. 25, 1932 |